United States Patent
Schneider et al.

(10) Patent No.: US 8,718,367 B1
(45) Date of Patent: May 6, 2014

(54) DISPLAYING AUTOMATICALLY RECOGNIZED TEXT IN PROXIMITY TO A SOURCE IMAGE TO ASSIST COMPARIBILITY

(75) Inventors: James Alan Schneider, San Jose, CA (US); Rajalakshmi Ganesan, Los Altos Hills, CA (US); Lionel Roy, Cupertino, CA (US); George Chiramattel Kunjachan, Bangalore (IN); Thanuj Thyagarajan Kambil, Bangalore (IN); Sumeet Bansal, Bangalore (IN); Bibhakar Ranjan, Bangalore (IN)

(73) Assignee: Intuit Inc., Mountain VIew, CA (US)

( * ) Notice: Subject to any disclaimer, the term of this patent is extended or adjusted under 35 U.S.C. 154(b) by 884 days.

(21) Appl. No.: 12/501,060

(22) Filed: Jul. 10, 2009

(51) Int. Cl.
*G06K 9/18* (2006.01)

(52) U.S. Cl.
USPC .......................................................... 382/176

(58) Field of Classification Search
None
See application file for complete search history.

(56) References Cited

U.S. PATENT DOCUMENTS

| | | | | |
|---|---|---|---|---|
| 4,949,392 A * | 8/1990 | Barski et al. | ................... | 382/283 |
| 5,418,864 A * | 5/1995 | Murdock et al. | .............. | 382/309 |
| 5,557,789 A * | 9/1996 | Mase et al. | ............................. | 1/1 |
| 5,631,984 A * | 5/1997 | Graf et al. | ...................... | 382/317 |
| 5,937,084 A * | 8/1999 | Crabtree et al. | .............. | 382/137 |
| 6,480,838 B1 * | 11/2002 | Peterman | .............................. | 1/1 |
| 7,020,320 B2 * | 3/2006 | Filatov | .......................... | 382/137 |
| 7,082,219 B2 * | 7/2006 | Bourbakis et al. | ............ | 382/187 |
| 7,573,598 B2 * | 8/2009 | Cragun et al. | ............... | 358/1.18 |
| 8,000,530 B2 * | 8/2011 | Jiang | ............................. | 382/181 |
| 8,077,263 B2 * | 12/2011 | Candelore | ..................... | 348/734 |
| 2001/0047331 A1 * | 11/2001 | Malanga et al. | ................ | 705/40 |
| 2002/0095444 A1 * | 7/2002 | Mantaro | ....................... | 707/515 |
| 2006/0149624 A1 * | 7/2006 | Baluja et al. | .................... | 705/14 |
| 2007/0118357 A1 * | 5/2007 | Kasravi et al. | .................. | 704/10 |
| 2008/0086420 A1 * | 4/2008 | Gilder et al. | .................... | 705/44 |
| 2008/0112620 A1 * | 5/2008 | Jiang | ............................. | 382/181 |
| 2008/0212901 A1 * | 9/2008 | Castiglia et al. | ............. | 382/311 |

* cited by examiner

*Primary Examiner* — Tahmina Ansari
(74) *Attorney, Agent, or Firm* — Park, Vaughan, Fleming & Dowler LLP

(57) ABSTRACT

One embodiment of the present invention provides a system that facilitates displaying automatically recognized text, wherein the automatically recognized text includes optical character recognition (OCR) text or intelligent character recognition (ICR) text. During operation, the system receives a source image containing text from a user. Next, the system performs a character-recognition operation on the source image to produce recognized text. The system then locates a data field within the source image. Next, the system identifies a subset of the recognized text that corresponds with the data field. After that, the system displays the source image to the user. At the same time, the system displays the subset of the recognized text in close proximity to the data field in the source image to facilitate comparing the recognized text with the text contained in the source image.

23 Claims, 4 Drawing Sheets

DISPLAYING AUTOMATICALLY RECOGNIZED TEXT IN PROXIMITY TO A SOURCE IMAGE TO ASSIST COMPARIBILITY

BACKGROUND

Related Art

Character-recognition systems are widely used to extract data from scanned copies of financial documents, such as checks and vouchers. These character-recognition systems convert printed and/or handwritten text into digital data that can be used by other software, such as accounting systems. While these character-recognition systems have become increasingly accurate over the years, they still make mistakes during the recognition process.

Some character-recognition systems seek to minimize these recognition errors by having a human double-check the recognition process. Typically, a human is presented with the recognized data from the image, and is asked to confirm or correct the data. While this technique helps reduce the number of recognition errors, it also has major drawbacks. First, this process is very time-consuming for the human. (In many cases, the human has to search for the data in the image that he or she is verifying.) Furthermore, in some cases where the number of images is large, the human may become aggravated and may not carefully review the recognized text for errors.

SUMMARY

One embodiment of the present invention provides a system that facilitates displaying automatically recognized text, wherein the automatically recognized text includes optical character recognition (OCR) text or intelligent character recognition (ICR) text. During operation, the system receives a source image containing text from a user. Next, the system performs a character-recognition operation on the source image to produce recognized text. The system then locates a data field within the source image. Next, the system identifies a subset of the recognized text that corresponds with the data field. After that, the system displays the source image to the user. At the same time, the system displays the subset of the recognized text in close proximity to the data field in the source image to facilitate comparing the recognized text with the text contained in the source image.

In some embodiments of the present invention, the system receives a text-correction operation from the user on the subset of the recognized text. Finally, the system performs the text-correction operation on the subset of the recognized text.

In some embodiments of the present invention, displaying the subset of the recognized text further comprises visually coupling the subset of the recognized text to the data field.

In some embodiments of the present invention, visually coupling the subset of the recognized text to the data field involves placing the subset of the recognized text in a callout that is coupled to the data field.

In some embodiments of the present invention, displaying the subset of the recognized text further comprises displaying the subset of the recognized text on top of the source image such that the subset of the recognized text partially obscures the source image.

In some embodiments of the present invention, displaying the subset of the recognized text further comprises adjusting an attribute of a font which is used to display the subset of the recognized text to match an attribute of a source font that is used to display the data field.

In some embodiments of the present invention, the system determines a probability that the subset of the recognized text includes a recognition error. Finally, the system adjusts an attribute of a font which is used to display the subset of the recognized text to indicate the probability to the user.

In some embodiments of the present invention, determining the probability that the subset of the recognized text includes a recognition error involves comparing the subset of the recognized text to a second subset of the recognized text, which corresponds to a second data field in the source image.

In some embodiments of the present invention, determining the probability that the subset of the recognized text includes a recognition error involves comparing the subset of the recognized text to a template for a document type corresponding to the source image.

In some embodiments of the present invention, displaying the subset of the recognized text in close proximity to the data field involves determining a location for the subset of the recognized text based on a set of heuristics.

In some embodiments of the present invention, the system performs a character-recognition operation on the source image by: determining a location of the data field within the source image, determining a data type for the data field based on the location of the data field, and selecting the character-recognition operation based on the data type.

In some embodiments of the present invention, the system determines the data type for the data field by: determining a document type for the source image and retrieving a template for the document type, wherein the template defines data types for data fields in the source image based on locations of the data fields within the source image.

DETAILED DESCRIPTION

Figure 1:
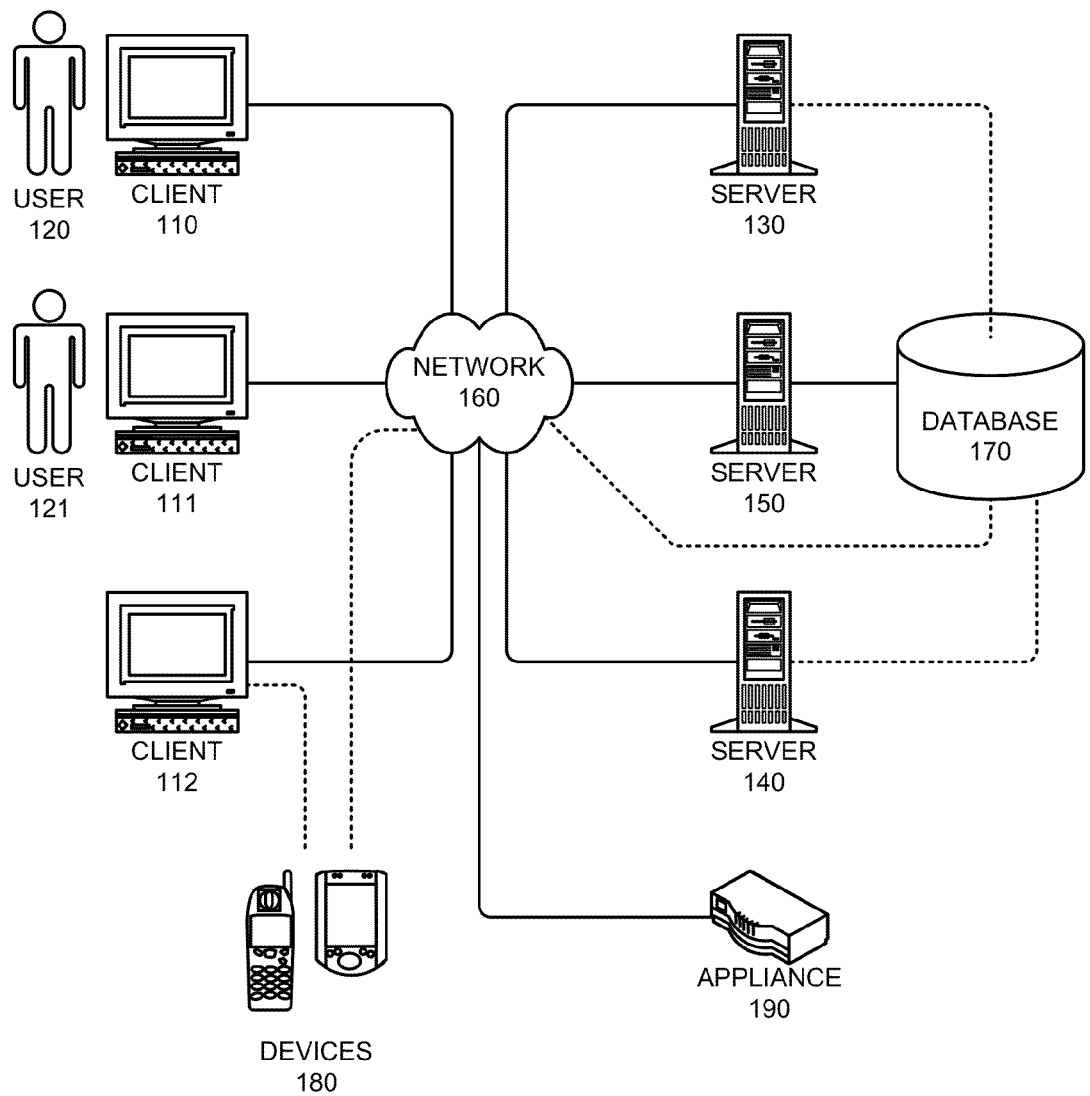
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Embodiments of the present invention help in reducing data-entry errors caused by fatigue wherein a user is making comparisons between an original image and text recognized from the original image, wherein the original image and the text recognized from the original image are not located in close proximity to each other. If the distance between the original image and the text recognized from the original image is too great, a quick visual comparison cannot be accomplished. In this scenario, the user has to: look at the image; memorize a few characters; look at the text recognized from the original image; compare with the corresponding characters memorized from the image; and repeat the process until all of the characters have been compared. This type of process is fatiguing and error prone. If the data read is close enough to the image, a quick purely visual comparison can be done. This is particularly important for long character strings like the (magnetic ink character recognition) MICR line at the bottom of a check.

One embodiment of the present invention provides a system that facilitates displaying automatically recognized text, wherein the automatically recognized text includes optical character recognition (OCR) text or intelligent character recognition (ICR) text. During operation, the system receives a source image containing text from a user. Next, the system performs a character-recognition operation on the source image to produce recognized text. The system then locates a data field within the source image. Next, the system identifies a subset of the recognized text that corresponds with the data field. After that, the system displays the source image to the user. At the same time, the system displays the subset of the recognized text in close proximity to the data field in the source image to facilitate comparing the recognized text with the text contained in the source image.

For example, in one embodiment, the system receives a check from a user via a scanner. The system then performs a character-recognition operation on one or more fields within the check, such as the payer field, date field, and amount field of the check. Finally, the system displays the recognized text in close proximity to the fields in the check to allow a user to compare the fields and the recognized text. For instance, the user may have handwritten the check to "ABC Corporation," and the system would display the recognized text "ABC Corporation" next to the handwritten field on the check.

In some embodiments of the present invention, the system receives a text-correction command from the user on the subset of the recognized text. In response to this command, the system performs the text-correction operation on the subset of the recognized text.

For example, in the case described above, the system may have recognized "ABC Corporation" as "A8C Corporation" while performing an ICR operation. In this example, the user is presented with the "A8C Corporation" text in close proximity to the "ABC Corporation" field that was handwritten on the check. After making a visual comparison, the user replaces the "8" character with a "B" character and submits the change to the system.

In some embodiments of the present invention, displaying the subset of the recognized text further includes visually coupling the subset of the recognized text to the data field. In some embodiments of the present invention, this involves placing the subset of the recognized text in a callout that is coupled to the data field. For example, the subset of the recognized text, such as "ABC Corporation" can be placed in a "cartoon bubble" that is attached to the data field.

In some embodiments of the present invention, displaying the subset of the recognized text further includes displaying the subset of the recognized text on top of the source image such that the subset of the recognized text partially obscures the source image. Note that the system can place the subset of the recognized text both outside of the borders of the source image, as well as on top of the source image. Although it is generally advantageous to place the subset of the recognized text over the source image in a location that does not obscure any other data fields, in some instances it may be desirable to obscure other data fields with the subset of the recognized text.

Note that the system may use various factors that inform the placement heurestics when determining where to display the subset of the recognized text. In some situations, the system may avoid displaying the subset of the recognized text over the top of data fields of importance (data fields that are flagged as important). Additionally, areas of the source image may have a weighted importance. For example, the back side of a check is typically unimportant to the system, except for the signature location. In this example, the signature region has a much higher weighted importance than the rest of the back of the check.

In some embodiments of the present invention, displaying the subset of the recognized text further involves adjusting an attribute of a font which is used to display the subset of the recognized text to match an attribute of a source font which is used to display the data field. This can involve any attribute of the font, such as size, color, font family, etc. The more similar the font of the subset of the recognized text is to the font of the data field, the easier it is to make a quick comparison of the two to determine if the subset of the recognized text was recognized correctly.

In some embodiments of the present invention, the system determines a probability that the subset of the recognized text includes a recognition error. Next, the system adjusts an attribute of a font which is used to display the subset of the recognized text to indicate the probability to the user. For example, in one embodiment, as the probability of a recognition error increases, the font that is used to display the subset of the recognized text becomes bolder and redder.

In some embodiments of the present invention, determining the probability that the subset of the recognized text includes a recognition error involves comparing the subset of the recognized text to a second subset of the recognized text corresponding to a second data field in the source image.

For example, checks typically contain the amount of the check in two locations. In one location, the amount is written out in long form, such as "two hundred and thirty-three and 17/100," while in a second location the amount of the check is written as "233.17." In this embodiment, the system can determine if the values recognized from both fields match. If not, the system can determine that a recognition error has occurred, or that there is a discrepancy on the check that needs to be addressed.

In some embodiments of the present invention, determining the probability that the subset of the recognized text includes a recognition error involves comparing the subset of the recognized text to a template for a document type associated with the source image. For example, the system may contain a template for the source image that defines the location and data type of each data field within the source image.

In some embodiments of the present invention, displaying the subset of the recognized text in close proximity to the data field involves determining a location for the subset of the recognized text based on a set of heuristics. As mentioned previously, in many instances it is advantageous to place the subset of the recognized text as close to the data field as possible without obscuring other data fields. In these embodiments, the system can use heuristics to determine a location in which to place the subset of the recognized text that does not obscure other data fields.

In some embodiments of the present invention, the system performs a character-recognition operation on the source image by: determining a location of the data field within the source image, determining a data type for the data field based on the location of the data field, and selecting the character-recognition operation based on the data type.

For example, if the system determines that the current data field is an amount field which only contains numbers, the system can select a very narrow character set for the character-recognition operation, thus reducing the chance of an error.

In some embodiments of the present invention, the system determines the data type for the data field by: determining a document type for the source image; and retrieving a template for the document type, wherein the template defines data types for data fields based on locations of the data fields within the source image.

Note that in some embodiments of the present invention, the system also receives from the user a symatic definition of the field as well as a confirmation of the data in the field. For example, the user may be presented with a drop-down list of field types (business name, customer name, etc) when confirming the data in a particular field. Furthermore, the user may be presented with a technique for defining new field types.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112, or a network, such as network 160. This includes, but is not limited to, cell phones, personal digital assistants (PDAs), smart-phones, personal music players (such as MP3 players), gaming systems, digital cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100.

System

Figure 2:
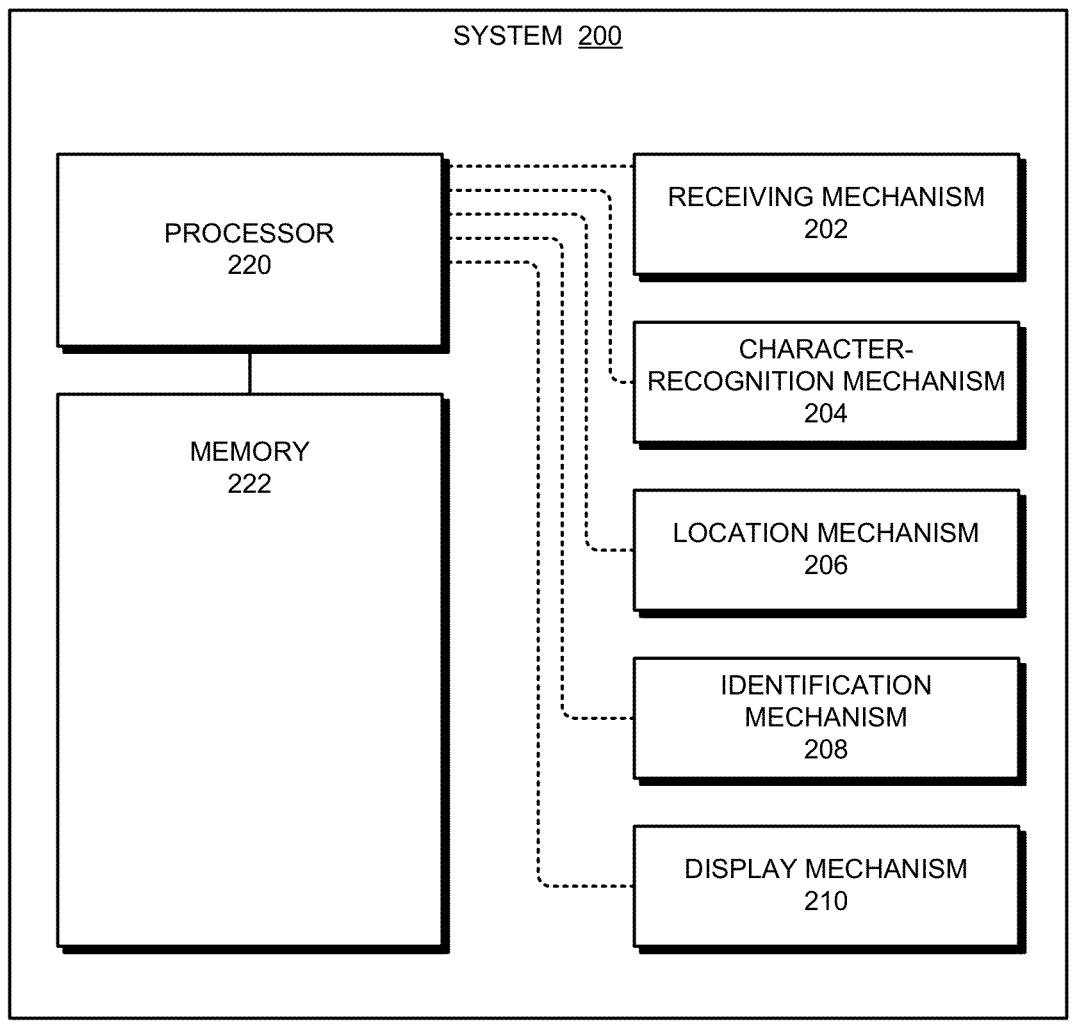
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, character-recognition mechanism 204, location mechanism 206, identification mechanism 208, display mechanism 210, processor 220, and memory 222.

Source Image

Figure 3:
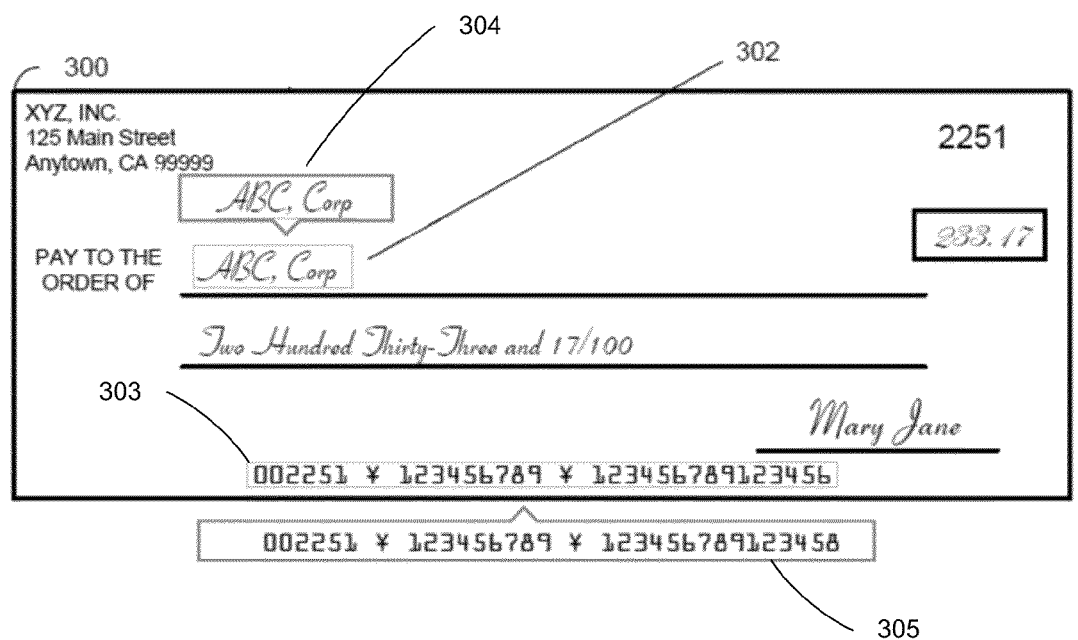
FIG. 3 presents a source image with recognized text in accordance with an embodiment of the present invention.

FIG. 3 presents a source image 300 with recognized text 304 in accordance with an embodiment of the present invention. Source image 300 includes data fields 302 and 303 and recognized text 304 and 305. Note that while source image 300 is described herein as a financial document, such as a check or a voucher, the present invention is not meant to be limited to such financial documents. Any type of document that contains text that can be recognized by a character-recognition operation can be used as source image 300.

As described previously, attributes of a font used to display recognized text are matched to attributes of a font used to display the corresponding data fields in the source image to make it easier for user 120 to make the necessary comparisons. For example, as illustrated in FIG. 3, the system chooses a font family, style, and size for recognized text 304 that closely matches the font family, style, and size for data field 302. Additionally, note that each data field/recognized text pair may use a different font family, style, and size. For example, the font family, style, and size for recognized text 305 closely matches the font family, style, and size for data field 303, but is quite different than the font family, style, and size of recognized text 304.

Automatically Displaying Recognized Text

Figure 4:
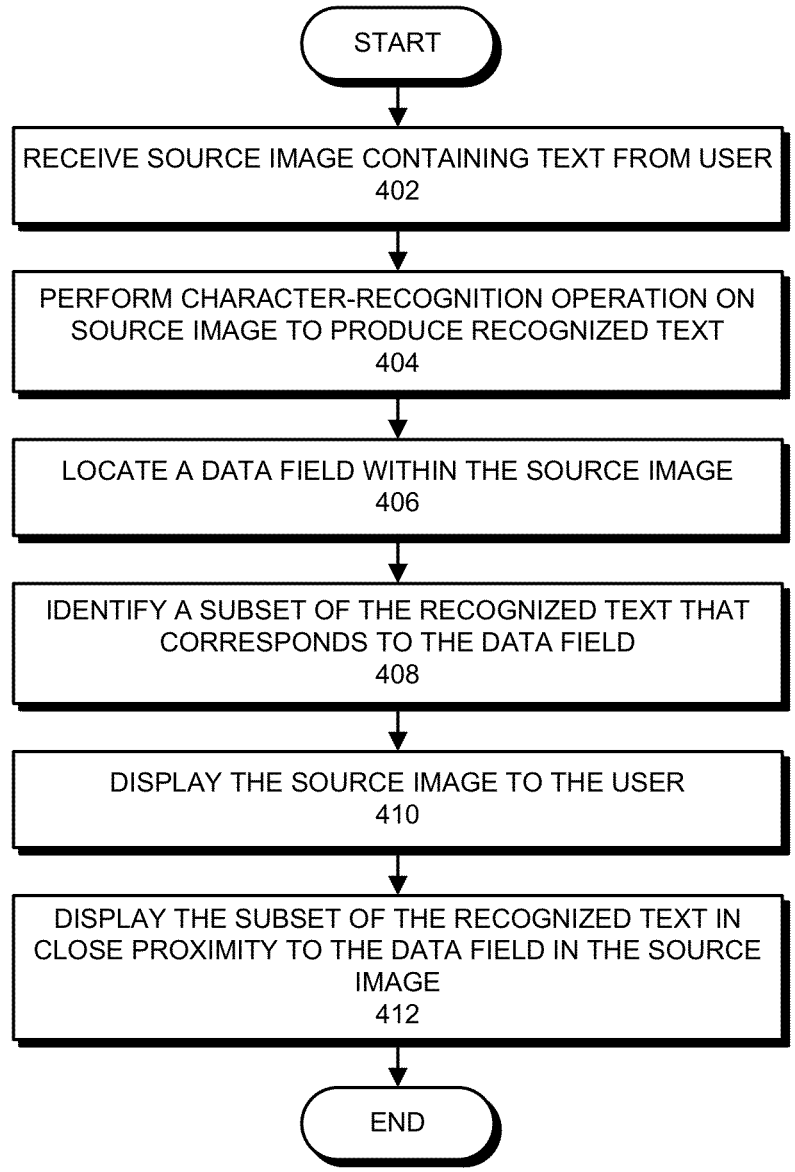
FIG. 4 presents a flow chart illustrating the process of automatically displaying recognized text in accordance with an embodiment of the present invention.

FIG. 4 presents a flow chart illustrating the process of automatically displaying recognized text in accordance with an embodiment of the present invention. During operation, receiving mechanism 202 receives source image 300 containing text from user 120 (operation 402). Next, character-recognition mechanism 204 performs a character-recognition operation on source image 300 to produce recognized text 304 (operation 404). Location mechanism 206 then locates a data field, such as data field 302, within source image 300 (operation 406).

Next, identification mechanism 208 identifies a subset of recognized text 304 that corresponds with data field 302 (operation 408). Display mechanism 210 then displays source image 300 to user 120 (operation 410). At the same time, display mechanism 210 displays the subset of recognized text 304 in close proximity to data field 302 in source image 300 to facilitate comparing the recognized text 304 with the text contained in source image 300 (operation 412).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for displaying automatically recognized text, wherein the automatically recognized text includes optical character recognition (OCR) text or intelligent character recognition (ICR) text, the method comprising:
   receiving a source image containing text from a user;
   performing a character-recognition operation on the source image to produce recognized text;
   locating a data field within the source image, wherein the data field includes original text;
   identifying a subset of the recognized text that corresponds to the original text in the data field;
   determining a probability that the subset of the recognized text includes a recognition error;
   adjusting an attribute of a font used to display the subset of the recognized text to indicate the probability to the user;
   displaying the source image to the user; and
   simultaneously displaying the subset of the recognized text in close proximity to the original text in the data field in the source image, such that the subset of the recognized text and the original text in the data field are both visible to the user, to facilitate comparing the recognized text with the original text contained in the source image.

2. The method of claim 1, further comprising:
   receiving a text-correction operation from the user on the subset of the recognized text; and
   performing the text-correction operation on the subset of the recognized text.

3. The method of claim 1, wherein displaying the subset of the recognized text further comprises visually coupling the subset of the recognized text to the data field.

4. The method of claim 3, wherein visually coupling the subset of the recognized text to the data field involves placing the subset of the recognized text in a callout that is coupled to the data field.

5. The method of claim 1, wherein displaying the subset of the recognized text further comprises displaying the subset of the recognized text on top of the source image such that the subset of the recognized text partially obscures the source image.

6. The method of claim 1, wherein displaying the subset of the recognized text further comprises adjusting an attribute of a font displaying the subset of the recognized text to match an attribute of a source font displaying the data field.

7. The method of claim 1, wherein determining the probability that the subset of the recognized text includes a recognition error involves comparing the subset of the recognized text to a second subset of the recognized text, which corresponds to a second data field in the source image.

8. The method of claim 1, wherein determining the probability that the subset of the recognized text includes a recognition error involves comparing the subset of the recognized text to a template for a document type associated with the source image.

9. The method of claim 1, wherein displaying the subset of the recognized text in close proximity to the data field involves determining a location for the subset of the recognized text based on a set of heuristics.

10. The method of claim 1, wherein performing the character-recognition operation on the source image involves:
    determining a location of the data field within the source image;
    determining a data type for the data field based on the location of the data field; and
    selecting the character-recognition operation based on the data type.

11. The method of claim 10, wherein determining the data type for the data field involves:
    determining a document type for the source image; and
    retrieving a template for the document type, wherein the template defines data types for data fields based on locations of the data fields within the source image.

12. A non-transitory computer-readable storage medium storing instructions that when executed by a computer cause the computer to perform a method for displaying automatically recognized text, wherein the automatically recognized text includes optical character recognition (OCR) text or intelligent character recognition (ICR) text, the method comprising:
    receiving a source image containing text from a user;
    performing a character-recognition operation on the source image to produce recognized text;
    locating a data field within the source image, wherein the data field includes original text;
    identifying a subset of the recognized text that corresponds to the original text in the data field;
    determining a probability that the subset of the recognized text includes a recognition error;
    adjusting an attribute of a font used to display the subset of the recognized text to indicate the probability to the user;
    displaying the source image to the user; and
    simultaneously displaying the subset of the recognized text in close proximity to the original text in the data field in the source image, such that the subset of the recognized text and the original text in the data field are both visible to the user, to facilitate comparing the recognized text with the original text contained in the source image.

13. The non-transitory computer-readable storage medium of claim 12, wherein the method further comprises:
   receiving a text-correction operation from the user on the subset of the recognized text; and
   performing the text-correction operation on the subset of the recognized text.

14. The non-transitory computer-readable storage medium of claim 12, wherein displaying the subset of the recognized text further comprises visually coupling the subset of the recognized text to the data field.

15. The non-transitory computer-readable storage medium of claim 14, wherein visually coupling the subset of the recognized text to the data field involves placing the subset of the recognized text in a callout that is coupled to the data field.

16. The non-transitory computer-readable storage medium of claim 12, wherein displaying the subset of the recognized text further comprises displaying the subset of the recognized text on top of the source image such that the subset of the recognized text partially obscures the source image.

17. The non-transitory computer-readable storage medium of claim 12, wherein displaying the subset of the recognized text further comprises adjusting an attribute of a font displaying the subset of the recognized text to match an attribute of a source font displaying the data field.

18. The non-transitory computer-readable storage medium of claim 12, wherein determining the probability that the subset of the recognized text includes a recognition error involves comparing the subset of the recognized text to a second subset of the recognized text which corresponds to a second data field in the source image.

19. The non-transitory computer-readable storage medium of claim 12, wherein determining the probability that the subset of the recognized text includes a recognition error involves comparing the subset of the recognized text to a template for a document type associated with the source image.

20. The non-transitory computer-readable storage medium of claim 12, wherein displaying the subset of the recognized text in close proximity to the data field involves determining a location for the subset of the recognized text based on a set of heuristics.

21. The non-transitory computer-readable storage medium of claim 12, wherein performing the character-recognition operation on the source image involves:
   determining a location of the data field within the source image;
   determining a data type for the data field based on the location of the data field; and
   selecting the character-recognition operation based on the data type.

22. The non-transitory computer-readable storage medium of claim 21, wherein determining the data type for the data field involves:
   determining a document type for the source image; and
   retrieving a template for the document type, wherein the template defines data types for data fields based on locations of the data fields within the source image.

23. An apparatus configured to display automatically recognized text, wherein the automatically recognized text includes optical character recognition (OCR) text or intelligent character recognition (ICR) text, comprising:
   a processor;
   a memory;
   a receiving mechanism configured to receive a source image containing text from a user;
   a character-recognition mechanism configured to perform a character-recognition operation on the source image to produce recognized text;
   a location mechanism configured to locate a data field within the source image, wherein the data field includes original text;
   an identification mechanism configured to identify a subset of the recognized text that corresponds to the original text in the data field;
   a calculation mechanism configured to determine a probability that the subset of the recognized text includes a recognition error;
   a font-adjustment mechanism configured to adjust an attribute of a font used to display the subset of the recognized text to indicate the probability to the user; and
   a display mechanism configured to display the source image to the user;
   wherein the display mechanism is further configured to simultaneously display the subset of the recognized text in close proximity to the original text in the data field in the source image, such that the subset of the recognized text and the original text in the data field are both visible to the user, to facilitate comparing the recognized text with the original text contained in the source image.

* * * * *

UNITED STATES PATENT AND TRADEMARK OFFICE
CERTIFICATE OF CORRECTION

PATENT NO.        : 8,718,367 B1
APPLICATION NO.   : 12/501060
DATED             : May 6, 2014
INVENTOR(S)       : Schneider et al.

Page 1 of 1

It is certified that error appears in the above-identified patent and that said Letters Patent is hereby corrected as shown below:

On the title page, item (54) and in the specification, column 1, line 4, in the title, please replace the word "COMPARIBILITY" with the word --COMPARABILITY--.

Signed and Sealed this
Thirtieth Day of September, 2014

Michelle K. Lee
*Deputy Director of the United States Patent and Trademark Office*